(12) United States Patent
Nie

(10) Patent No.: US 7,143,183 B2
(45) Date of Patent: Nov. 28, 2006

(54) SERVER MODULE FOR MODULARLY DESIGNED SERVER

(75) Inventor: Xiaoning Nie, München (DE)

(73) Assignee: Infineon Technologies AG, Munich (DE)

( * ) Notice: Subject to any disclaimer, the term of this patent is extended or adjusted under 35 U.S.C. 154(b) by 742 days.

(21) Appl. No.: 09/817,031

(22) Filed: Mar. 27, 2001

(65) Prior Publication Data

US 2001/0034794 A1 Oct. 25, 2001

(30) Foreign Application Priority Data

Mar. 31, 2000 (DE) ............................... 100 16 236

(51) Int. Cl.
*G06F 15/16* (2006.01)
(52) U.S. Cl. .................. 709/238; 709/224; 370/395.31
(58) Field of Classification Search ................ 709/238, 709/240, 242, 232, 200–203, 217–227; 370/389, 370/392, 355–356, 397, 399, 409, 395.31
See application file for complete search history.

(56) References Cited

U.S. PATENT DOCUMENTS

| | | | | |
|---|---|---|---|---|
| 5,031,089 A * | 7/1991 | Liu et al. ..................... | 709/226 |
| 5,283,897 A * | 2/1994 | Georgiadis et al. ......... | 718/105 |
| 5,396,552 A | 3/1995 | Jahn et al. | |
| 6,111,874 A * | 8/2000 | Kerstein ..................... | 370/389 |
| 6,246,680 B1 | 6/2001 | Muller et al. ............... | 370/389 |
| 6,266,335 B1 * | 7/2001 | Bhaskaran .................. | 370/399 |
| 6,356,551 B1 * | 3/2002 | Egbert ......................... | 370/389 |
| 6,370,584 B1 * | 4/2002 | Bestavros et al. .......... | 709/238 |
| 6,424,621 B1 * | 7/2002 | Ramaswamy et al. ...... | 370/230 |
| 6,449,647 B1 * | 9/2002 | Colby et al. ................ | 709/226 |
| 6,578,087 B1 * | 6/2003 | Garakani et al. ........... | 709/242 |
| 6,650,646 B1 * | 11/2003 | Galway et al. ............. | 370/397 |
| 6,654,373 B1 * | 11/2003 | Maher et al. ............... | 370/392 |
| 6,744,775 B1 * | 6/2004 | Beshai et al. ............... | 370/409 |
| 6,757,291 B1 * | 6/2004 | Hu .............................. | 370/401 |
| 6,760,775 B1 * | 7/2004 | Anerousis et al. .......... | 709/238 |

OTHER PUBLICATIONS

Bransky et al.; "Layer 4 Switching" Published Sep. 1997. Retrieved from http://penguin.cc.edu/network/L4_switching.html on Jul. 7, 2004.*

Kumar, S.; Raghavan, S.V.; "Dynamic management of routing tables and connection re-routing in ATM networks" ATM, 1999. ICATM '99. 1999 2nd International Conference on Jun. 21-23, 1999 pp. 107-114.*

Harbaum, T.; Zitterbart, M.; Griffoul, F.; Rothig, J.; Schaller, S.; Stuttgen, H.J.; "Layer 4+ switching with QoS support for RTP and HTTP" Global Telecommunications Conference, 1999. GLOBECOM '99, vol. 2, 1999 pp. 1591-1596 vol. 2.*

(Continued)

*Primary Examiner*—Moustafa M. Meky
(74) *Attorney, Agent, or Firm*—Greenblum & Bernstein, P.L.C.

(57) ABSTRACT

A server module for a modularly designed server (1) having at least one data processing unit (17) for data processing data packets, at least one addressable communication interface (19) for connecting the server module (2, 3, 4, 5) to an external network (13) via which the data packets are transmitted, a switching interface (20) for connecting the server module (2, 3, 4, 5) to a switching device (7) of the modularly designed server (1); and having a routing calculation unit (18) for calculating a server module address using a routing table on the basis of the utilization level of the data processing units of all the server modules (2, 3, 4, 5) of the modularly designed server (1).

10 Claims, 2 Drawing Sheets

OTHER PUBLICATIONS

Uehara, S.; Hara, H.; Kanaya, N.; Ookubo, T.; Matsutsuka, T.; "Enterprise model-based software architecture with server component integration" Enterprise Distributed Object Computing Workshop, 1998. Second International Nov. 3-5, 1998 pp. 356-363.*

W. Richard Stevens; "TCP/IP Illustrated: The Protocols"; 1994; Addison Wesley; vol. 1; Chapter 10: pp. 127-131.*

Mark A. Sportack et al.; "High-Performance Networking"; 1997; Sams.net Publishing; 1st Edition; Chapter 8: pp. 144-153.*

Azer Bestavros, Mark Crovella, Jun Liu, and David Martin. Distributed packet rewriting and its application to scalable server architectures. In Proceedings of the 1998 International Conference on Network Protocols. IEEE, Nov. 1998.*

"Compact PCL mit-Pentium II-Power", Elektronik Praxis, Nr.24, Dec. 14, 1999, pp. 106-110.

"Einfuhrung in die Datenkommunikation", by Kaufels, 4, Auflage, Datacom, 1991, ISBN 3-89238-039-2Gb., pp. 41-47, 60-67 and 195-208.

* cited by examiner

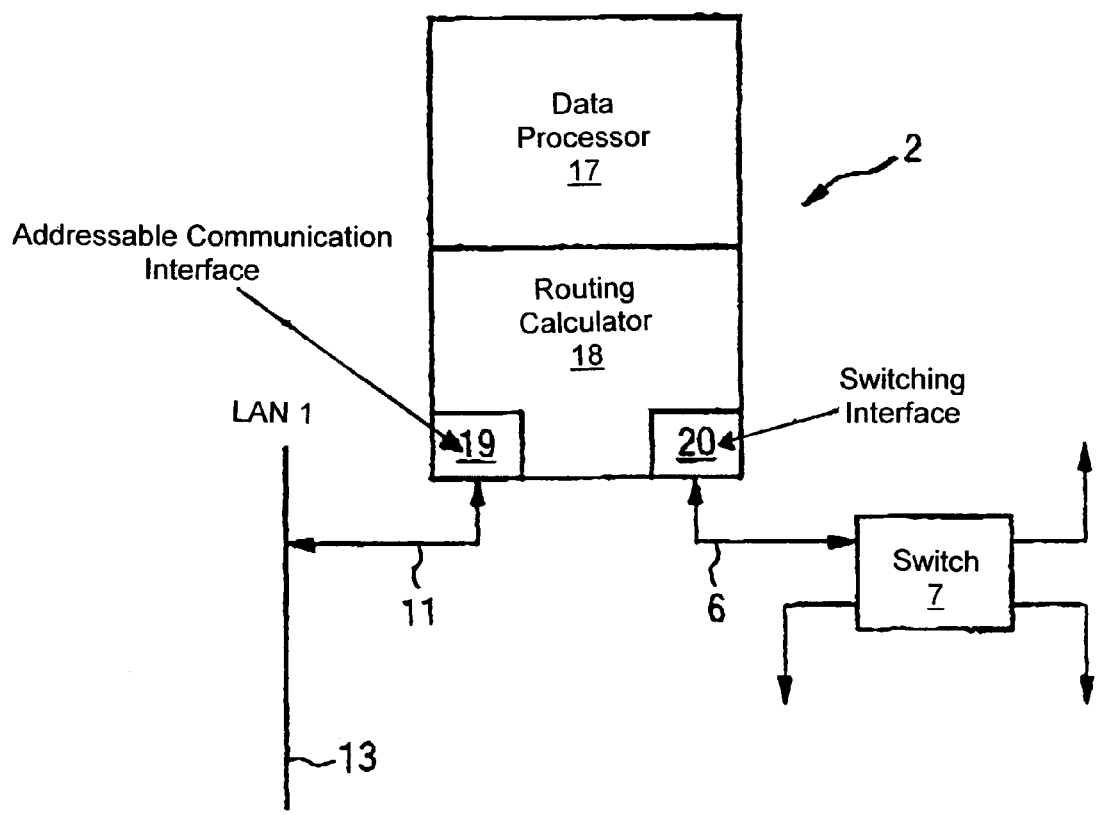

SERVER MODULE FOR MODULARLY DESIGNED SERVER

The invention relates to a server module for a modularly designed server.

Servers are computing devices providing central services for a plurality of users or clients in a distributed computer system. The servers and users are usually connected to one another by means of an LAN. According to their function, servers can be distinguished as file servers, application servers, print servers, CD-ROM servers, e-mail servers, for example. A file server manages data and/or files centrally and makes them available to other computers. Application servers make programs available centrally to the network or to the users. A print server manages print jobs centrally and distributes them to the appropriate printers in the network. A CD-ROM server has a plurality of CD-ROM drives which can be accessed via the LAN. An e-mail server is used as a mailbox for all subscribers and manages all incoming and outgoing e-mails.

FIG. 1 shows the design of a network having a plurality of servers based on the prior art. The servers A-D take on various functions within the network, for example server A is a file server, server B is an application server, server C is a print server, server D is a CD-ROM server. The servers are connected via a communication interface to an LAN and via a router interface to a router for data interchange with the other servers, Data interchange takes place using data packets. The router is a link computer between the two LAN networks and represents part of the bottom three layers of the OSI reference model. As data packet switcher, the router evaluates the Layer 3 information contained in the data packets, for example the IP addresses, and uses routing tables to ascertain the best further data path. In this context, the router can also send or receive data packets via an LAN or via telecommunication networks.

The servers connected to the router based on the prior art have two principal component parts, namely a data processing unit or a processor and a network interface card NIC. If the server A connected to the LAN1 wants to communicate with the server B connected to the LAN2, the data need to be put into the suitable generic format. In the network interface card $NIC_a$ of the server A, the data which are to be transmitted to the server B are packed into the data format of the network LAN1 (framing) and are sent to the line card of the router. The line card of the router unpacks the data (deframing) and then puts or packs them into the data format of the second network LAN2 (framing). The rouser then sends the reformatted data to the server B. The data packets sent to the router by the server A contain the server B as destination address.

One disadvantage of the network arrangement shown in FIG. 1 is that the technical complexity for transmitting data from one server to another server via the router is relatively involved in technical terms, since constant packing and unpacking or data format conversion needs to take place. The network interface cards present in the servers for this purpose have a high level of circuit complexity, which means that the servers have relatively high production costs.

Another disadvantage of the network arrangement shown in FIG. 1 is that there must always be a router between the servers. The number of possible servers in the network arrangement shown in FIG. 1 is therefore limited by the performance capability and the number of server connections of the router. This complicates flexible extension of the conventional network arrangement shown in FIG. 1.

It is therefore the object of the present invention to provide a server module for a modularly designed server which permits data interchange with a low level of circuit complexity.

The invention achieves this object by means of a server module having the features specified in patent claim 1.

The invention provides a server module for a modularly designed server having at least one data processing unit for data processing data packets, at least one addressable communication interface for connecting the server module to an external network via which the data packets are transmitted, a switching interface for connecting the server module to a switching device of the modularly designed server, and having a routing calculation unit for calculating a server module address using a routing table on the basis of the utilization level of the data processing units of all the server modules of the modularly designed server.

In one preferred embodiment, the :server module is provided for data processing data packets of a particular prescribed application type.

In this case, the server module address is preferably calculated on the basis of the application type of the transmitted data packet.

The communication interfaces preferably have buffer scores for temporarily storing transmitted data packets.

In one particularly preferred embodiment, the routing Table is constantly updated in an associated routing server module of the modularly designed server.

The routing server module transmits the current routing table to the other server modules, preferably via the switching interface.

In another preferred embodiment, the routing server module collects and evaluates data relating to the utilization level of the data processing units of all server modules of the modularly designed server.

In this case, the routing server module updates the rousing table on the basis of the evaluated utilization level data, the assigned application types of the other server modules and also priority information data for the transmitted data packets.

In another preferred embodiment, if the utilization level of the data processing units of a server module is zoo high, at least some of the data processing processes executed in this server module are transmitted to data processing unite; of other server modules.

A preferred embodiment of the inventive server module for a modularly designed server is described below with reference to the appended figures in order to explain features which are fundamental to the invention.

In the figures:

FIG. 3 shows a block diagram of a server module according to the invention.

Figure 2:
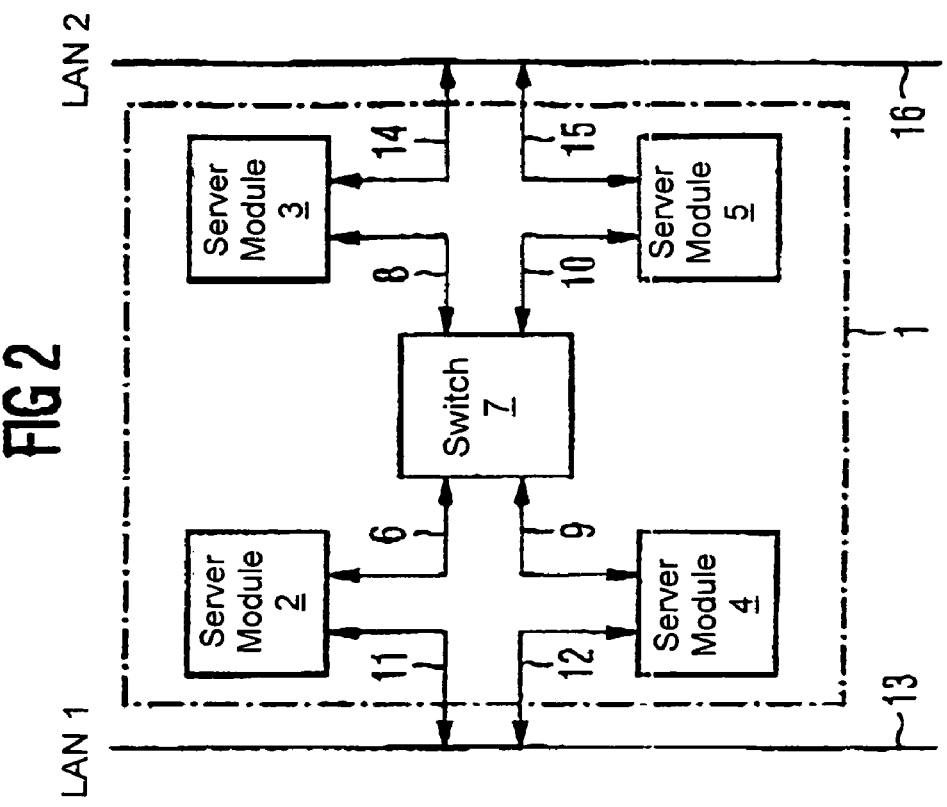
FIG. 2 shows a modularly designed server comprising a plurality of server modules, in accordance with the invention.
Figure 1:
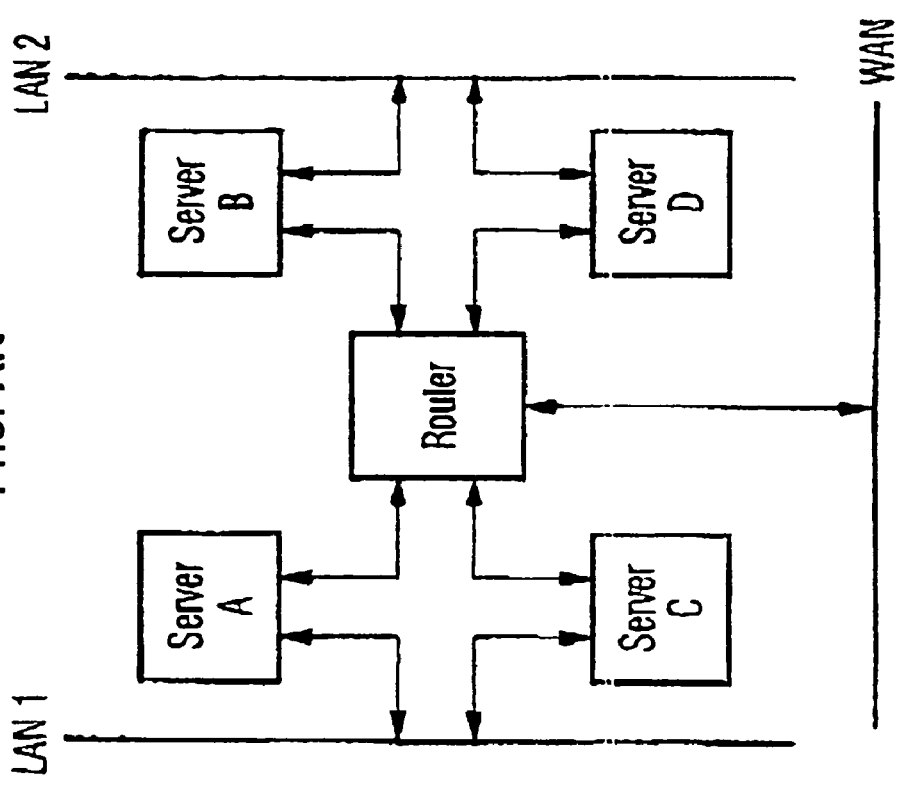
FIG. 1 shows a network arrangement based on the prior art.

FIG. 2 shows a modularly designed server 1 whose modular design comprises a plurality of different server modules 2, 3, 4, 5. Each server module 2, 3, 4, 5 is provided for data processing data packets corresponding to a particular application type. By way of example, server modules 3, 5 are file servers for data processing FTP files, while the server module 4 is a print server. The server module 2 is connected to a switching device 7 via an internal data bus or a data line 6. The switching device 7 is connected to the other server modules 3, 4, 5 of the modularly designed server 1 via other internal data buses; or data lines 8, 9, 10. The server modules 2, 4 are connected to a first local area network 13 via connecting data buses or data lines 11, 12, and the server modules 3, 5 are connected to a second local area network 16 via connecting data buses 14, 15.

FIG. 3 is a block diagram to explain the design of an inventive server module of the modularly designed server 1. All the server modules 2, 3, 4, 5 of the modularly designed server 1 have the same circuit design. The design of one server module is shown in FIG. 3 using the server module 2. The server module 2 contains at least one data processing unit 17, a routing calculation unit 18, at least one addressable communication interface 19 and also a switching interface 20. The data processing unit 17 can contain one or more processors for data processing data packets. The server module 2 is connected to the external network 13 via the addressable communication interface and the connecting data bus 11. The external data packets received from the network 13 are routed via the connecting data bus 11 to the communication interface 19. The incoming data packet is a data frame comprising header data (header) and useful data (payload). The header data contain a line layer address or Layer 2 address. In addition, the incoming Internet data frame contains information relating to the application type. The routing calculation unit 18 checks whether or not the line layer address of the incoming data packet is addressing a server module within the modularly designed server 1. If the modularly designed server 1 is not addressed, the routing calculation unit reads from a routing table the port address of the external destination computer and sends the data packet to this external destination computer via the communication interface 19. If, conversely, the line layer address contained in the incoming data packet or the MAC information data does/do address a server module within the modularly designed server 1, the application type of the received data frame is first determined. On the basis of the computer utilization level of the date processing units within the various server modules 2, 3, 4, 5 of the modularly designed server 1, the server module address of that server module which is associated with this application type and whose data processing units have the lowest utilization level is read from the current routing table. The routing calculation unit sends the received useful data as an Internet protocol data packet or IP datagram via the internal data bus lines and the switching device 7 to this server module address which has been read. To this end, the routing calculation unit 18 either generates an internal header containing the ascertained server module address, and said header is added to the IF datagram, or it drives the switching device 7 using control lines (not shown) such that the Internet protocol data packet obtained from the useful data of the incoming data packet is switched to that server module which, is addressed by the server module address coming from the routing table.

The various server modules 2, 3, 4, 5, in the modularly designed server 1 take on various functions. One server module is assigned, as routing table manager, to update the routing table. Another server module determines, as load manager, the computer utilization level of all the data processing units of the various server modules within the modularly designed server 1. The server module assigned to ascertain the load constantly collects data relating to the computer utilization level of the data processing units of the other server modules and evaluates these data. The evaluation results are transmitted to that server module which manages the routing table. There, the routing table is constantly updated on the basis of the transmitted utilization level data, the assigned application types of the server modules and priority information data for the incoming data packets. Data copies of the updated routing table are sent to the other server modules, so that each server module 2–5 within the modularly designed server 1 is informed about the state of the utilization level of the other server modules. If the utilization level of the data processing units of a server module is too high, at least some of the data processing processes executed in this server module are then preferably transmitted to data processing units of other server modules. This largely brings the computer utilization levels of the various server modules into line with one another.

If, by way of example, the server modules 3, 5 are suitable as file servers for processing FTP applications, and the server module 2 receives an external data packet containing an FTP application from the local area network 13 via the connection 11, it uses the routing table contained in the routing calculation unit 18 to determine the server module address of that file server which has the lowest computer utilization level. For this purpose, there is a copy of the updated routing table in a memory device of the routing calculation unit 18. If, by way of example, the computer utilization level of the server module 3 operating as a file server is lower than the computer utilization level of the server module 5, which is likewise operating as a file server, the routing table is updated by the routing table manager such that, for an incoming data packet which requires a file server, the server module address generated by the routing calculation unit 18 is the address of the server module 3. The routing calculation unit 18 preferably provides the Internet protocol data packet contained in the Internet data packet as payload or useful data with an internal header or header data which contain the address of the server module 3 as the server module address. The Internet protocol data packets provided with the internal header are transmitted to the server module 3 as internal data packets via the internal data bus 6, the switching device 7 and the internal data bus 8. To this end, the switching device 7 reads the internal server module address contained in the header of she internal data packet and forwards the Internet protocol data packet appended thereto to the addressed server module 3.

The server module according to the invention has an integrated router function, which means that the modularly designed server 1 requires no independent router. The modularly designed inventive server 1 shown in FIG. 2 has a switching device 7 to which, in principle, any desired number of server modules 2–5 can be connected. The modularly designed server 1 can therefore easily be extended flexibly with other server modules to increase the power and to cake on additional server services by connecting additional server modules to the switching device 7. Since each server module has a dedicated routing calculation unit, the load equalization between the various server modules within the modularly designed server 1 is optimized. Each server module forwards incoming data packets to that server module which is responsible for the application type and has the lowest computer utilization level. In addition, data processing processes which are being executed within the data processing units of an overloaded server module are transferred to server modules which have a lower level of loading.

The modular design of the server 1 thus ensures an optimally equalized computer utilization level and flexible extension options. Complicated reformatting of external data packer formats to internal data packet formats is eliminated, since the IP data packets contained in the external data packets or Internet frames are forwarded unchanged to the appropriate server modules. The circuit complexity for internally forwarding received data packets to the other server modules is therefore low.

The present disclosure relates to subject matter contained in priority German Patent Application No. 100 16 236.3, filed on Mar. 31, 2000, the contents of which is herein expressly incorporated by reference in its entirety.

The invention claimed is:

1. A modularly designed server having a plurality of server modules, each server module of said plurality of server modules comprising:
    at least one data processor that data processes a data packet;
    at least one addressable communication interface that connects said server module to a first local network via which the data packet is transmittable; and
    a switching interface that connects said server module to a switching device of the modularly designed server to forward the data packet received by the at least one addressable communication interface to a second server module of the modularly designed server connected to a second local network, said switching interface including a routing calculator that calculates an internal server module address using a routing table based upon a utilization level of data processors of said plurality of server modules of the modularly designed server, such that forwarding of the data packet requires no independent router;
    wherein one server module of the plurality of server modules is provided as a routing server module that periodically updates the routing table in accordance with evaluated utilization data of other server modules, the routing server module transmitting a current routing table to the other server modules.

2. The modularly designed server of claim 1, wherein the at least one data processor of the server module processes data packets of a particular prescribed application type.

3. The modularly designed server of claim 2, wherein the data packet contains information of a particular prescribed application type, the server module address being calculated in accordance with the particular prescribed application type of the transmitted data packet.

4. The modularly designed server of claim 1, wherein said at least one addressable communication interface includes a buffer that temporarily stores a transmitted data packet.

5. The modularly designed server of claim 1, wherein said server module transmits the current routing table to the other server modules near the switching interface.

6. The modularly designed server of claim 5, wherein said server module collects and evaluates data relating to the utilization level of the data processors of all server modules of the modularly designed server.

7. The modularly designed server of claim 6, wherein the server module further updates the routing table on the basis of assigned application types of the other server modules and priority information data for the transmitted data packet.

8. The modularly designed server of claim 1, wherein a data processing process executed within one server module is transmitted to data processors of other server modules when the utilization level of the data processor of a particular server module exceeds a predetermined level.

9. The modularly designed server of claim 1, wherein each server module of said plurality of sever modules are connected together via an internal data bus.

10. The modularly designed server of claim 1, wherein each server module of said plurality of sever modules are connected together via a data line.

* * * * *